Patented Oct. 19, 1948

2,451,779

UNITED STATES PATENT OFFICE 2,451,779

MANUFACTURE OF AMIDINES

Wallace Frank Short and Peter Oxley, Nottingham, England, assignors to Boots Pure Drug Company, Limited, Nottingham, England, a company of Great Britain No Drawing. Application June 4, 1947, Serial No. 752,569. In Great Britain June 12, 1946

9 Claims. (Cl. 260—501)

The invention relates to the production of compounds containing the amidine grouping

—C(:NH)NH$_2$ and represented by the general formula

R.C(:NH)NH$_2$ where R is an alkyl, aralkyl, substituted aralkyl, aryl, substituted aryl, alicyclic or heterocyclic radical.

We have found that a substance containing the above amidine grouping may be obtained by treating a mono-, di-, or tri-N-substituted amidine with ammonia in presence of at least sufficient acid to form the salt of the amidine. The substituted amidines used in the reaction are of the general formula R.C(:NR$_1$)NR$_2$R$_3$ where R is as above mentioned, and R$_1$, R$_2$ and R$_3$ may be hydrogen atoms or alkyl, aralkyl, aryl or substituted aryl, alicyclic or heterocyclic radicals or R$_2$, R$_3$ may be a polymethylene chain but R$_1$, R$_2$ and R$_3$ may not all be hydrogen atoms.

The acid may be introduced into the reaction mixture either as its ammonium salt or as its substituted amidine salt or as its salt with a base employed as diluent or solvent or it may be added as such to a mixture of ammonia and substituted amidine.

The acid or equivalent acid radical is conveniently a sulphonic acid although any acid which gives amidine salts which are stable at the reaction temperature, e. g. hydrochloric, nitric, acetic or picric acid may be employed in the reaction. The temperature of the reaction should be limited on the upper side to 160° C. since above this temperature the reverse reaction may occur.

The reaction takes place over a wide range of temperature (about 30° C. to 160° C.) and may be effected for example by bringing together the molten salt of the substituted amidine and gaseous ammonia or by bringing the reactants together dissolved in a solvent or suspended in a diluent, e. g. a tertiary base or a base substantially weaker than ammonia such as aniline, toluidine, 2-aminopyridine, pyridine, quinoline, methylaniline or dimethylaniline or an inert liquid such as nitrobenzene or acetamide. Hydroxylic solvents in general are undesirable as they interfere with the reaction and reduce the yield, though certain of them such as ethylene glycol may be used without detriment.

The process of the invention gives unsubstituted amidine salts in high purity and very high yield, and enables any desired salt of any unsubstituted amidine to be obtained directly from the salt of a corresponding N- or N'-substituted amidine having substituents as specified above. This is of importance because the direct production of unsubstituted amidines from nitriles is frequently more difficult than that of corresponding N- or N-N'-substituted amidines and the invention therefore provides a convenient process for the production of unsubstituted amidines which have hitherto been inaccessible or only difficultly available.

The amidine salts produced in the reaction may be converted to the free amidines by methods known in the art, e. g. by treatment with an alkali.

The invention is further illustrated by the following examples:

Example 1

In the preparation of benzamidine benzenesulphonate a stream of ammonia gas is passed into 3.54 g. of molten N-phenylbenzamidine benzenesulphonate maintained at a temperature of 140° C. After 1 hour the passage of ammonia gas is stopped, the product is cooled, triturated with acetone and the acetone is filtered off. The solid residue is benzamidine benzenesulphonate having a melting point of 178° C.

Example 2

In the preparation of benzamidine hydrochloride a stream of ammonia gas is passed into a solution of 4.0 g. of N-phenylbenzamidine hydrochloride in 6 c. c. of aniline maintained at a temperature of 140° C. During the passage of ammonia gas a solid is precipitated which later re-dissolves. After 1 hour the passage of ammonia gas is stopped, the product is cooled, 10 c. c. of acetone are added and the mixture is filtered. The filtrate is mixed with 10 c. c. of ether and allowed to stand whereupon benzamidine hydrochloride separates in the form of crystals having a melting point of 171° C.

Example 3

In the preparation of benzamidine benzenesulphonate a stream of ammonia gas is passed into a solution of 3.54 g. of N-phenylbenzamidine benzenesulphonate in 5 c. c. of nitrobenzene maintained at a temperature of 140° C. After 1½ hours the passage of ammonia gas is stopped, the product is cooled and acetone is added. The solid product which is filtered from the acetone solution is benzamidine benzenesulphonate having a melting point of 178° C.

Example 4

In the preparation of benzamidine benzenesulphonate a stream of ammonia gas is passed into a molten mixture of 3.68 g. of N-methyl-N'-phenylbenzamidine benzenesulphonate and 0.5 c. c. of aniline maintained at a temperature of 140° C. After 1 hour the passage of ammonia gas is stopped, the product is allowed to cool somewhat and is mixed, while still warm with 10 c. c. of acetone. On cooling the solution obtained benzamidine benzenesulphonate separates in the form of crystals having a melting point of 177–178° C. The mother liquor contains N-methylbenzamidine benzenesulphonate.

Example 5

In the preparation of 2:4-dichlorobenzamidine benzenesulphonate a stream of ammonia gas is passed into a solution of 1.06 g. of N-phenyl-2:4-dichlorobenzamidine benzenesulphonate in 1.0 c. c. of aniline maintained at a temperature of 140° C. After 1 hour the passage of ammonia gas is stopped and the mixture is cooled. The product is then triturated with acetone, filtered and the solid residue is crystallised from 5 c. c. of hot water whereby 2:4-dichlorobenzamidine benzenesulphonate is obtained in the form of crystals having a melting point of 258° C.

Example 6

In the preparation of alpha:beta-bis(p-amidinophenoxy) ethane dibenzenesulphonate a stream of ammonia gas is passed into a solution of 1.92 g. of alpha:beta-bis(p-N-phenylamidinophenoxy) ethane dibenzenesulphonate in 5 c. c. of aniline maintained at a temperature of 140° C. After 1 hour the passage of ammonia gas is stopped and the mixture is cooled. The cooled product is triturated with 10 c. c. of acetone and the solid material is filtered off and crystallised from water whereby alpha:beta-bis(p-amidinophenoxy) ethane dibenzenesulphonate is obtained in the form of crystals having a melting point of 312° C.

Example 7

In the preparation of benzamidine benzenesulphonate, a stream of ammonia gas is passed during one hour into a solution of 3.54 g. of N-phenylbenzamidine benzenesulphonate in 4 c. c. of aniline which is kept at a temperature of 100° C. during the period of reaction. After cooling, the reaction product is triturated with acetone when colourless crystals of benzamidine benzenesulphonate (melting point 177° C.) are obtained.

Example 8

In the preparation of benzamidine benzenesulphonate, a solution of 3.54 g. of N-phenylbenzamidine benzenesulphonate in 10 c. c. of nitrobenzene is heated in an acetone vapour bath so that the temperature of the solution is about 56° C. A stream of ammonia gas is now passed into the heated solution during 2 hours. After the reaction mixture has been cooled, the crystals which separated are collected, and, after washing with acetone are recrystallised from water when colourless crystals of the required benzenesulphonate are obtained.

Example 9

In the preparation of benzamidine acetate, 3.92 g. of N-phenylbenzamidine is added to 5 c. c. of glacial acetic acid, the mixture is heated in a bath at 100° C. and a stream of ammonia is passed in for 35 minutes. Crystallisation of the product from 10 c. c. of water affords large plates of benzamidine acetate, melting with decomposition at 243° C. (Found, N, 15.4; calculated, for $C_9H_{12}O_2N_2$, N, 15.6 per cent.)

Example 10

In the preparation of benzamidine benzenesulphonate ammonia is passed for 1 hour into a solution of 3.54 g. of N-phenylbenzamidine benzenesulphonate in 5 g. of acetamide which is maintained at 140° C. To the product, after cooling, is added 15 c. c. of acetone and 15 c. c. of ether, whereupon benzamidine benzenesulphonate is obtained in the form of colourless crystals melting at 178° C.

In the above example, an equal weight of nitrobenzene or ethylene glycol may be used as solvent in place of acetamide.

Example 11

In the preparation of benzamidine benzenesulphonate, a solution of 0.98 g. of N-phenylbenzamidine and 0.88 g. of ammonium benzenesulphonate in 5 c. c. of pyridine is left to stand in a stoppered bottle for two weeks at room temperature. The solution is then diluted with ether and the solid which separates re-crystallised from water, yielding colourless crystals of benzamidine benzenesulphonate, melting at 178° C.

Example 12

In the preparation of benzamidine benzenesulphonate, a stream of ammonia gas is passed for 4½ hours into a solution of 4.22 g. of N-phenyl-N', N'-pentamethylenebenzamidine benzenesulphonate in 2.0 c. c. of aniline which is maintained at 140° C. On cooling and diluting with acetone, the solution deposits crystals of the required salt, melting at 178° C. The N-phenyl-N'-N-pentamethylenebenzamidine benzenesulphonate used as starting material may be prepared by the method described in U. S. Patent No. 2,433,489, and melts at 160° C. (Found, N, 6.8; $C_{24}H_{26}O_3N_2S$ requires N, 6.6 per cent.)

Example 13

In the preparation of benzamidine toluene-p-sulphonate, ammonia is passed for 3 hours into a solution of 1.05 g. of N-phenyl-N-methylbenzamidine and 0.95 g. of ammonium toluene-p-sulphonate in 10 c. c. of nitrobenzene which is maintained at 140° C. The solution on cooling deposits crystals of benzamidine toluene-p-sulphonate, which after recrystallisation from water melt at 195° C.

Example 14

In the preparation of benzamidine picrate, ammonia is passed for 2 hours into a solution of 2.20 g. of N-phenyl-N-methylbenzamidine picrate in 2 c. c. of aniline which is maintained at 140° C. Recrystallisation of the product from 10 c. c. of methyl alcohol affords flat needles of benzamidine picrate melting at 240° C.

Example 15

In the preparation of benzamidine benzenesulphonate, a solution of 1.13 g. of N-p-anisylbenzamidine and 0.90 g. of ammonium benzenesulphonate in 5 c. c. of dry pyridine is left to stand in a closed bottle for six days at room temperature. The solvent is then removed by distillation in vacuuo, and the residue triturated with chloroform giving colourless crystals of benzamidine benzenesulphonate melting at 177–8°

C. The N-p-anisylbenzamidine used as starting material may be prepared by the method described in U. S. Patent No. 2,433,489 and crystallises from benzene in colourless plates melting at 116° C. (Found, N, 12.6; $C_{14}H_{14}ON_2$ requires N, 12.4 per cent.)

*Example 16*

In the preparation of benzamidine nitrate, ammonia is passed into a suspension of 0.8 g. of ammonium nitrate in a solution of 2.3 g. of N-p-chlorophenylbenzamidine in 5 c. c. of pyridine which is maintained at 100° C. for two hours. The ammonium nitrate goes into solution during the first fifteen minutes of the reaction. On cooling and diluting with ether, the product deposits crystals of benzamidine nitrate, melting at 127° C.

*Example 17*

In the preparation of benzamidine benzenesulphonate, ammonia is passed for two hours into a suspension of 3.99 g. of N-p-nitrophenylbenzamidine benzenesulphonate in 10 c. c. of nitrobenzene at 140° C. The clear solution thus obtained deposits, on cooling, crystals of benzamidine benzenesulphonate, which after crystallisation from water melts at 177–178° C.

*Example 18*

In the preparation of benzamidine toluene-p-sulphonate, ammonia is passed for 1½ hours into a solution of 0.985 g. of N-2-pyridylbenzamidine and 0.945 g. of ammonium toluene-p-sulphonate in 2.0 g. of 2-aminopyridine which is maintained at 140° C. The product is cooled and crystallised from water, yielding colourless crystals of benzamidine toluene-p-sulphonate melting at 195° C.

*Example 19*

In the preparation of veratramidine benzenesulphonate, a stream of ammonia is passed for one hour into a solution of 2.07 g. of N-phenylveratramidine benzenesulphonate in 6 c.c. of nitrobenzene at 140° C. The crystals which separate from the solution on cooling are collected with suction and crystallised from water, whereby veratramidine benzenesulphonate is obtained in the form of colourless flat needles melting at 190° C. (Found, N, 8.3; $C_{15}H_{18}O_5N_2S$ requires N, 8.3 per cent.) The N-phenylveratramidine benzenesulphonate used as starting material may be prepared by the method described in U. S. Patent No. 2,433,489 and forms colourless prisms melting at 177° C. (Found, N. 6.9; $C_{21}H_{22}O_5N_2S$ requires N, 6.8 per cent.)

*Example 20*

In the preparation of p-methylsulphonylbenzamidine toluene-p-sulphonate, ammonia is passed into a solution of 3.98 g. of N-ethyl-p-methylsulphonylbenzamidine toluene-p-sulphonate which is maintained at 140° C. for three hours. The product is cooled, diluted with acetone, and the solid which separates is recrystallised from water, yielding colourless crystals of p-methylsulphonyl-benzamidine toluene-p-sulphonate melting at 293° C.

*Example 21*

In the preparation of p-methylsulphonylbenzamidine toluene-p-sulphonate, a stream of ammonia is passed for 80 minutes into a solution of 2.13 g. of N,N-diethyl-p-methylsulphonylamidine toluene-p-sulphonate in 2.0 c. c. of quinoline at 100° C. The product on cooling deposits colourless crystals of p-methylsulphonylbenzamidine toluene-p-sulphonate, melting at 292–293° C. Crystals of p-methylsulphonylbenzamidine melting at 202° C. may be obtained by pouring a warm aqueous solution of the amidine toluene-p-sulphonate into ice-cold 5 N sodium hydroxide.

*Example 22*

In the preparation of anisamidine toluene-p-sulphonate, a stream of ammonia is passed for 2 hours into a solution of 2.06 g. of N-p-tolylanisamidine toluene-p-sulphonate in 4 c. c. of aniline which is maintained at 140° C. The product is cooled, diluted with 10 c. c. of acetone, and the solid which separates is crystallised from water whereby anisamidine toluene-p-sulphonate is obtained in the form of colourless plates melting at 206° C. (Found, N. 8.8; $C_{15}H_{18}O_4N_2S$ requires N, 8.7 per cent.) The N-p-tolylanisamidine toluene-p-sulphonate used as starting material may be prepared by the method described in U. S. Patent No. 2,433,489 and crystallises from alcohol in colourless needles melting at 221.5° C. (Found, N, 6.8; $C_{22}H_{24}O_4N_2S$ requires N, 6.8 per cent.) The addition of 5 N sodium hydroxide to a cold aqueous solution of anisamidine toluene-p-sulphonate gives colourless crystals of the free base, melting at 119° C.

*Example 23*

In the preparation of alpha-naphthamidine benzenesulphonate, ammonia is passed for five hours into a solution of 4.04 g. of N-phenyl-alpha-naphthamidine benzenesulphonate in 4 c. c. of aniline at 140° C. The product is cooled, diluted with ether, and the solid which separates is crystallised from iso-propyl alcohol, whereby the required salt is obtained in the form of colourless crystals melting at 218° C. The N-phenyl-alpha-naphthamidine benzenesulphonate used as starting material may be prepared by the method described in U. S. Patent No. 2,433,489 and when crystallised from isopropyl alcohol melts at 186° C. (Found, N. 6.9 $C_{23}H_{20}O_3N_2S$ requires N, 6.9 per cent.) The addition of 5 N sodium hydroxide to a cold aqueous solution of alpha-naphthamidine benzenesulphonate precipitates the free amidine in the form of colourless plates melting at 154° C.

*Example 24*

In the preparation of beta-napthamidine benzenesulphonate, ammonia is passed for 3 hours into a solution of 4.18 g. of N-o-tolyl-beta-naphthamidine benzenesulphonate in 10 c. c. of nitrobenzene maintained at 140° C. On cooling, beta-naphthamidine benzenesulphonate crystallises from the solution in nacreous plates melting at 203° C. beta-Naphthamidine is obtained in the form of colourless needles melting at 136° C. when 5 N sodium hydroxide is added to a cold aqueous solution of the benzenesulphonate.

*Example 25*

In the preparation of 2-amidinopyridine benzenesulphonate, a mixture of 5.2 g. of 2-cyanopyridine and 12.55 g. of aniline benzenesulphonate is heated for one hour at 200° C. whereby N-phenylamidinopyridine benzenesulphonate is produced. The temperature is then reduced to 140° C., 10 c. c. of aniline is added and a stream of ammonia is passed into the solution for 2 hours. The product is cooled, diluted with acetone and the solid which separates is recrystallised from iso-propyl alcohol whereby the required salt is obtained in the form of colourless plates melting at 146° C.

Example 26

In the preparation of phenylacetamidine toluene-p-sulphonate, a solution of 3.96 g. of N-p-tolylphenylacetamidine toluene-p-sulphonate in liquid ammonia is maintained at −33° C. for five days. It is then evaporated to dryness, and the residue on crystallisation from iso-propyl alcohol affords phenylacetamidine toluene-p-sulphonate in the form of colourless crystals melting at 199° C. (Found, N, 9.1; $C_{15}H_{18}O_3N_2S$ requires N, 9.15 per cent.) The N-p-tolylphenylacetamidine toluene-p-sulphonate used as starting material may be obtained by the method described in U. S. Patent No. 2,433,489 and forms colourless crystals melting at 158° C. (Found, N, 6.9; $C_{22}H_{24}O_3N_2S$ requires N, 7.1 per cent.)

Example 27

In the preparation of p-nitrophenylacetamidine benzenesulphonate ammonia is passed for one hour into a solution of 4.13 g. of N-phenyl-p-nitrophenylacetamidine benzenesulphonate in 8 c. c. of aniline which is maintained at 140° C. The resulting dark red solution is cooled, diluted with acetone, and the solid which separates re-crystallised from water, whereby the required salt is obtained in the form of pale yellow plates, melting at 198.5° C. (Found, N, 12.6 $C_{14}H_{15}O_5N_3S$ requires N, 12.5 per cent.) The N-phenyl-p-nitrophenylacetamidine benzenesulphonate employed as starting material may be prepared by the method described in U. S. Patent No. 2,433,489. It crystallises from water in pale yellow plates melting at 163° C. (Found, N, 10.1 $C_{20}H_{19}O_5N_3S$ requires N, 10.2 per cent.)

Example 28

In the preparation of valeramidine toluene-p-sulphonate, a mixture of 4.2 g. of n-butyl cyanide and 14.0 g. of p-toluidine toluene-p-sulphonate is heated under reflux at 200° C. for 2 hours whereby N-p-tolyl-valeramidine toluene-p-sulphonate is formed. The temperature is then reduced to 140° C. and ammonia is passed into the melt for two hours. The product is then cooled and crystallised from acetone, whereby valeramidine toluene-p-sulphonate is obtained in the form of long colourless needles melting at 134° C. (Found, N, 10.2 $C_{12}H_{20}O_3N_2S$ requires N, 10.3%.)

Example 29

In the preparation of p-toluamidine benzenesulphonate, ammonia is passed for two hours into a solution of 4.48 g. of N-p-tolyl-p-toluamidine and 3.50 g. of ammonium benzenesulphonate in 2 c. c. of dimethylaniline which is maintained at a temperature of 140° C. The solution is then cooled, diluted with 20 c. c. of acetone, and the crystals which separate are recrystallised from water, whereby p-toluamidine benzenesulphonate is obtained in the form of colourless flat needles having a melting point of 195.5° C. (Found, N, 9.6 $C_{14}H_{16}O_3N_2$ requires N, 9.6 per cent.) The N-p-tolyl-p-toluamidine used as starting material may be prepared by the method described in U. S. Patent No. 2,433,489 and crystallises from petrol in colourless plates melting at 115° C. (Found, N, 12.5; $C_{15}H_{16}N_2$ requires N, 12.5 per cent.)

Example 30

In the preparation of p-toluamidine toluene-p-sulphonate, ammonia is passed for three hours into a solution of 4.89 g. of N-p-chlorophenyl-p-toluamidine and 3.78 g. of ammonium toluene-p-sulphonate in 5 c. c. of methylaniline which is maintained at 140° C. After cooling, the product is triturated with acetone and the residue re-crystallised from water, yielding the required salt in the form of colourless plates melting at 191° C. (Found, N, 9.4; $C_{15}H_{18}O_3N_2S$ requires N, 9.15 per cent.) The N-p-chlorophenyl - p - toluamidine used as starting material may be prepared by the method described in U. S. Patent No. 2,433,489 and melted at 144.5° C. (Found, N, 11.5; $C_{14}H_{13}N_2Cl$ requires N, 11.45 per cent.)

Example 31

In the preparation of 4,4'-diamidino-alpha; gamma-diphenoxypropane dibenzenesulphonate, 7.8 g. of alpha:gamma-bis-(p-N-phenylamidino-phenoxy)-propane dibenzenesulphonate which may be prepared by application of the methods described in U. S. Patent No. 2,433,489 is dissolved in 15 c. c. of aniline and ammonia is passed through the solution, which is maintained at 100° C. for 4 hours. The product is cooled, diluted with 30 c. c. of acetone and the crystals which separate are re-crystallised from water, whereby 4,4'-diamidino - alpha:gamma - diphenoxypropane dibenzenesulphonate is obtained in the form of colourless leaflets of melting point 236–237° C.

Example 32

In the preparation of benzamidine picrate, ammonia is passed for 1½ hours into a solution of 1.03 g. of N-phenyl-N'-benzyl-benzamidine picrate in 1.0 c. c. of aniline which is maintained at 140° C. The product is cooled and diluted with 5 c. c. of iso-propyl alcohol, and on standing the solution deposits crystals of benzamidine picrate melting at 238–9° C.

Example 33

In the preparation of amidinocyclohexane picrate, ammonia is passed for 2 hours into a molten mixture of 2.02 g. of N-phenylamidinocyclo-hexane and 2.65 g. of methylaniline benzenesulphonate which is maintained at 100°. After cooling, the product containing the benzenesulphonate of amidinocyclohexane, is dissolved in aqueous alcohol, and 5 c. c. of saturated aqueous lithium picrate solution is added. Crystallisation of the resulting precipitate from methyl-alcohol affords orange-yellow prisms of amidinocyclohexane picrate, melting with decomposition at 230–2° C. (Found, N, 19.9; $C_{13}H_{17}O_7N_5$ requires N, 19.7%.)

We claim:

1. A process for the manufacture of a compound having the amidine grouping

—C(:NH)NH$_2$ comprising the step of heating at a temperature within the range 30° C. to 160° C. and at atmospheric pressure a mixture of reactants consisting of ammonia and an N-substituted amidine of the general formula $R.C(:NR_1)NR_2R_3$ where R is a member of the group consisting of monovalent radicals of the aliphatic, araliphatic and aromatic series and of the heterocyclic series wherein the hetero-atoms are nitrogen atoms and the unsatisfied valency bonds are on carbon and $R_1$, $R_2$ and $R_3$ are members of the group consisting of hydrogen atoms and monovalent radicals of the aliphatic, araliphatic and aromatic series and of the heterocyclic series wherein the hetero-atoms are nitrogen atoms and the unsatisfied valency bonds are on carbon, one of said reactants being present in the form of a salt.

2. A process as claimed in claim 1 wherein the reactants are heated in the presence of a diluent which is an organic base weaker than ammonia.

3. A process as claimed in claim 1 wherein the reactants are heated in the presence of a diluent which is an inert liquid.

4. A process as claimed in claim 1 wherein the salt is a sulphonic acid salt.

5. Process as claimed in claim 1 and including the step of converting the substituted amidine salt produced initially to the corresponding free amidine.

6. A process for the manufacture of a compound having the amidine grouping $$-C(:NH)NH_2$$

comprising the step of heating at a temperature within the range 30° C. to 160° C. and at atmospheric pressure a mixture of ammonia and a salt of an N-substituted amidine of the general formula $R.C(:NR_1)NR_2R_3$ where R is a member of the group consisting of monovalent radicals of the aliphatic, araliphatic and aromatic series and of the heterocyclic series wherein the heteroatoms are nitrogen atoms and the unsatisfied valency bonds are on carbon and $R_1$, $R_2$ and $R_3$ are members of the group consisting of hydrogen atoms and monovalent radicals of the aliphatic, araliphatic and aromatic series and of the heterocyclic series wherein the hetero-atoms are nitrogen atoms and the unsatisfied valency bonds are on carbon.

7. A process for the manufacture of a compound having the amidine grouping $$-C(:NH)NH_2$$

comprising the step of heating at a temperature within the range of 30° C. to 160° C. and at atmospheric pressure a mixture of an ammonium salt and an N-substituted amidine of the general formula $R.C(:NR_1)NR_2R_3$ where R is a member of the group consisting of monovalent radicals of the aliphatic, araliphatic and aromatic series and of the heterocyclic series wherein the heteroatoms are nitrogen atoms and the unsatisfied valency bonds are on carbon and $R_1$, $R_2$ and $R_3$ are members of the group consisting of hydrogen atoms and monovalent radicals of the aliphatic, araliphatic and aromatic series and of the heterocyclic series wherein the hetero-atoms are nitrogen atoms and the unsatisfied valency bonds are on carbon.

8. A process as claimed in claim 7 in which excess ammonia is present during the heating.

9. A process as claimed in claim 6 wherein the N-substituted amidine salt is formed, in situ, from the N-substituted amidine and a salt of the substance selected from the group consisting of ammonia and organic bases weaker than ammonia.

WALLACE FRANK SHORT.
PETER OXLEY.

REFERENCES CITED

The following references are of record in the file of this patent:

Franklin, "J. Am. Chem. Soc.," vol. 55 (1933), pages 4912–4915.

Franklin, "Nitrogen System of Compounds" (1935), page 271.